US011954071B1

(12) United States Patent
Shin

(10) Patent No.: US 11,954,071 B1
(45) Date of Patent: Apr. 9, 2024

(54) FILE NAMING AND MANAGEMENT SYSTEM

(71) Applicant: Jennifer Shin, New York, NY (US)

(72) Inventor: Jennifer Shin, New York, NY (US)

(*) Notice: Subject to any disclaimer, the term of this patent is extended or adjusted under 35 U.S.C. 154(b) by 0 days.

(21) Appl. No.: 16/005,674

(22) Filed: Jun. 11, 2018

Related U.S. Application Data

(60) Provisional application No. 62/517,930, filed on Jun. 11, 2017.

(51) Int. Cl.
*G06F 16/16* (2019.01)
*G06F 3/04817* (2022.01)
*G06F 3/0486* (2013.01)

(52) U.S. Cl.
CPC ........ *G06F 16/164* (2019.01); *G06F 3/04817* (2013.01); *G06F 3/0486* (2013.01); *G06F 16/168* (2019.01)

(58) Field of Classification Search
CPC .. G06F 3/04817; G06F 16/164; G06F 3/0486; G06F 16/168
USPC .......................................................... 707/825
See application file for complete search history.

(56) References Cited

U.S. PATENT DOCUMENTS

| | | | | |
|---|---|---|---|---|
| 6,826,727 B1* | 11/2004 | Mohr | ..................... | G06F 40/103 715/235 |
| 7,019,743 B1* | 3/2006 | Wainwright | .......... | G06F 3/0486 715/846 |
| 7,529,811 B2* | 5/2009 | Thompson | ............ | G06F 16/284 707/999.005 |
| 9,098,333 B1* | 8/2015 | Obrecht | .................... | G06F 9/50 |
| 9,201,558 B1* | 12/2015 | Dingman | ................ | G06F 3/048 |
| 9,430,114 B1* | 8/2016 | Dingman | ................ | G06F 16/25 |
| 9,734,168 B1* | 8/2017 | Shin | ........................ | G06F 16/51 |
| 10,210,229 B2* | 2/2019 | Bhudavaram | ......... | G06F 16/164 |
| 10,417,184 B1* | 9/2019 | Long | .................... | G06F 16/1794 |
| 10,592,683 B1* | 3/2020 | Lim | ........................ | H04L 63/20 |
| 11,238,012 B1* | 2/2022 | Liang | .................. | G06F 9/45533 |
| 2003/0225801 A1* | 12/2003 | Devarakonda | ........ | G06F 16/221 |
| 2005/0005233 A1* | 1/2005 | Kays | ....................... | G06F 16/84 715/239 |
| 2005/0038812 A1* | 2/2005 | Tirpak | ..................... | G06F 16/48 |
| 2005/0177796 A1* | 8/2005 | Takahashi | ............. | G06F 16/168 715/769 |
| 2006/0123010 A1* | 6/2006 | Landry | ................... | G06F 16/25 |
| 2006/0277160 A1* | 12/2006 | Singh | ..................... | G06F 16/168 |
| 2007/0100768 A1* | 5/2007 | Boccon-Gibod | .... | G06Q 20/202 705/59 |
| 2007/0136308 A1* | 6/2007 | Tsirigotis | .............. | G06F 16/122 |
| 2007/0299806 A1* | 12/2007 | Bardsley | ............. | G06F 16/2365 |
| 2008/0181107 A1* | 7/2008 | Moorthi | ................ | G06F 16/119 370/231 |
| 2008/0201307 A1* | 8/2008 | Swartz | ................ | G06F 3/04817 |
| 2009/0106546 A1* | 4/2009 | Weichel | ............. | G06F 9/44505 713/100 |

(Continued)

*Primary Examiner* — Mark E Hershley
(74) *Attorney, Agent, or Firm* — Lee & Lin IP PLLC; Rita H. Lin

(57) ABSTRACT

A file organization system includes a container for renaming files added thereto, the container having a file naming convention by which the files are named. The container may generate a log file to store information regarding the history of the files, for example, their previous file names, current file names, previous locations, current file location, the dates when the file was renamed or moved, etc. which may help identify and track the files.

22 Claims, 11 Drawing Sheets

(56) References Cited

U.S. PATENT DOCUMENTS

| | | | | |
|---|---|---|---|---|
| 2009/0271451 | A1* | 10/2009 | Young | G06F 16/16 707/999.203 |
| 2010/0211412 | A1* | 8/2010 | Tholl | G06Q 40/08 705/4 |
| 2011/0320477 | A1* | 12/2011 | Nestler | G06F 3/04817 707/769 |
| 2012/0210265 | A1* | 8/2012 | Delia | G06F 3/04817 715/771 |
| 2013/0006997 | A1* | 1/2013 | Asayama | G06F 16/2272 707/740 |
| 2013/0055127 | A1* | 2/2013 | Saito | G06F 3/04883 715/769 |
| 2015/0317049 | A1* | 11/2015 | Miura | G06F 3/0482 715/843 |
| 2016/0078245 | A1* | 3/2016 | Amarendran | G06N 20/00 713/193 |
| 2016/0162364 | A1* | 6/2016 | Mutha | G06F 3/0608 707/645 |
| 2016/0162374 | A1* | 6/2016 | Mutha | G06F 11/3409 714/19 |
| 2016/0253517 | A1* | 9/2016 | Mori | G09C 1/00 713/165 |
| 2016/0330257 | A1* | 11/2016 | Norton | H04L 65/762 |
| 2016/0378577 | A1* | 12/2016 | Russell | G06F 16/2455 719/318 |
| 2017/0093922 | A1* | 3/2017 | Duan | H04L 67/75 |
| 2017/0249472 | A1* | 8/2017 | Levy | G06F 21/6245 |
| 2017/0286455 | A1* | 10/2017 | Li | G06F 16/212 |
| 2017/0286525 | A1* | 10/2017 | Li | G06N 20/00 |
| 2017/0329788 | A1* | 11/2017 | Grasselt | G06F 16/3344 |
| 2018/0143975 | A1* | 5/2018 | Casal | G06F 40/51 |
| 2019/0095599 | A1* | 3/2019 | Iliofotou | G06F 16/337 |
| 2019/0250835 | A1* | 8/2019 | Piccinini | G06F 21/78 |
| 2019/0251190 | A1* | 8/2019 | Scrivano | G06F 16/162 |

\* cited by examiner

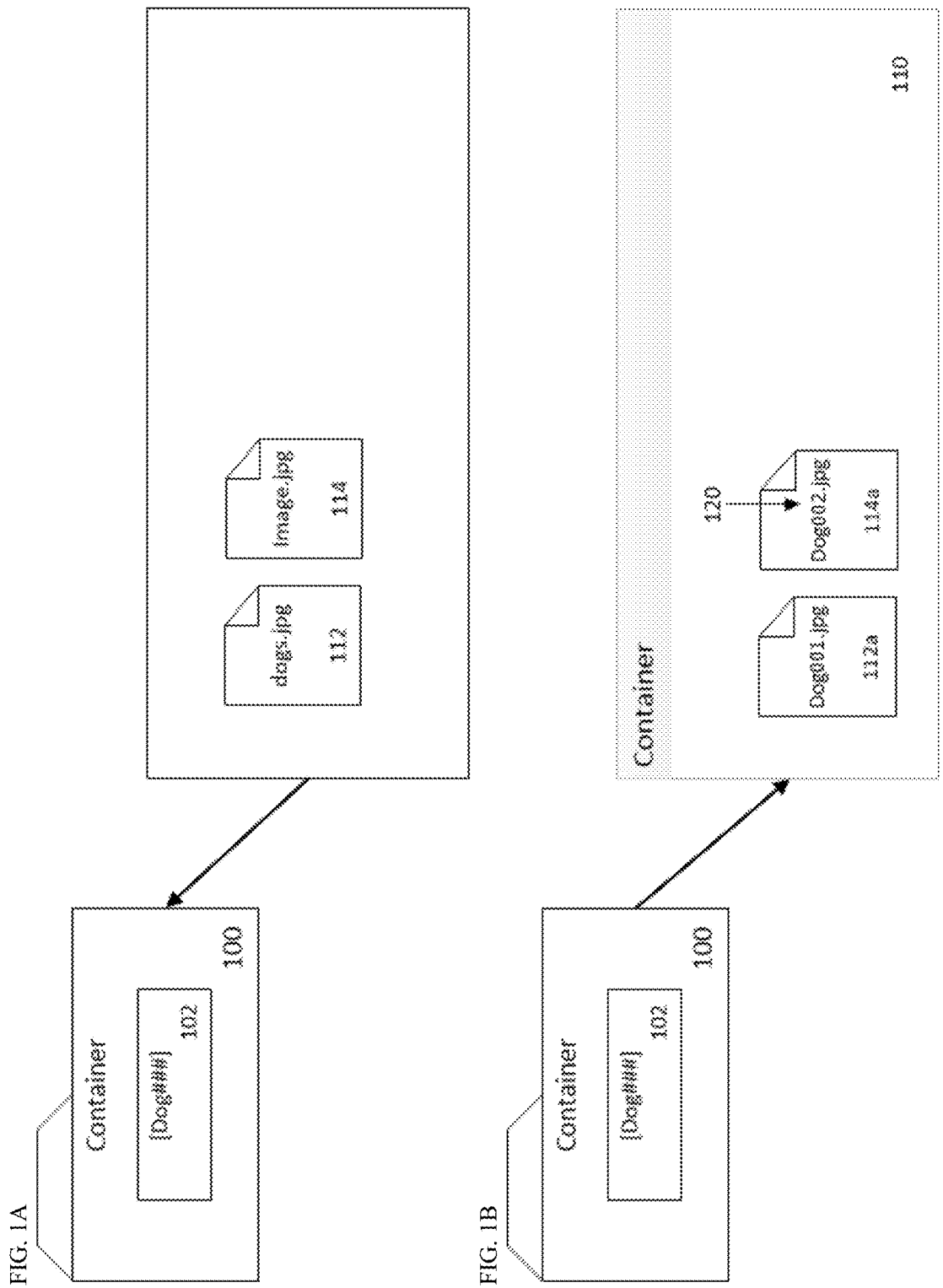

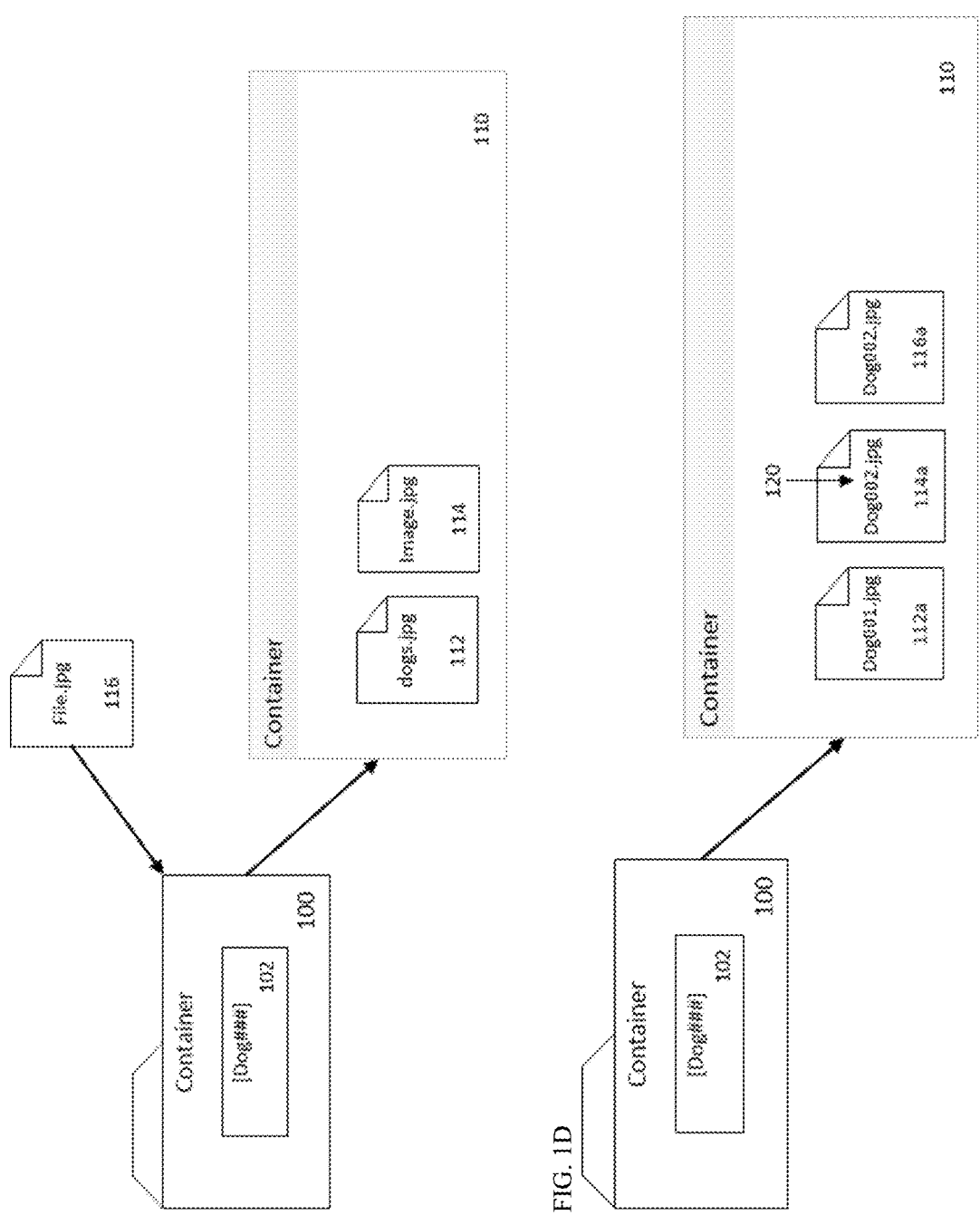

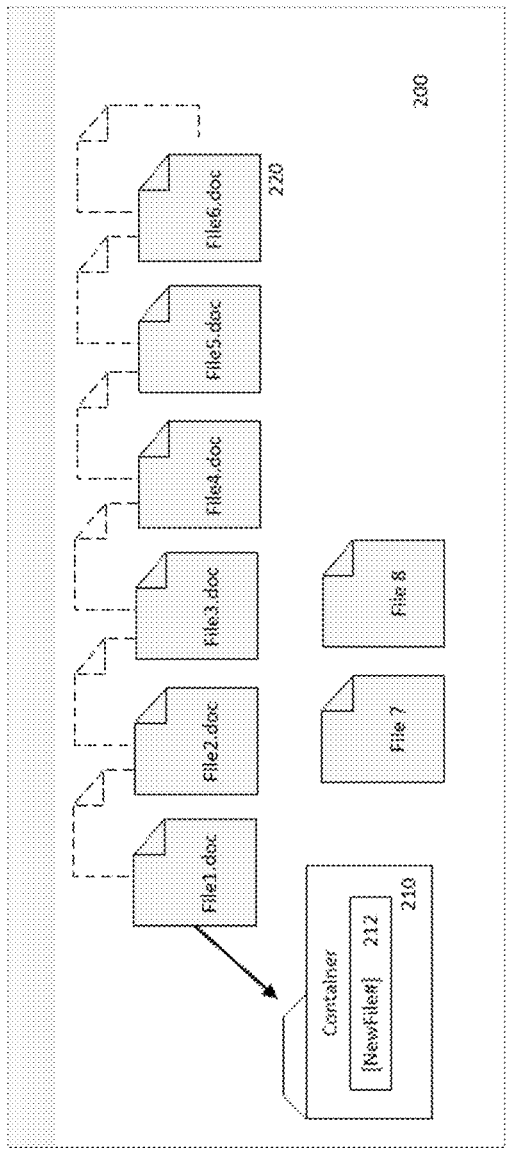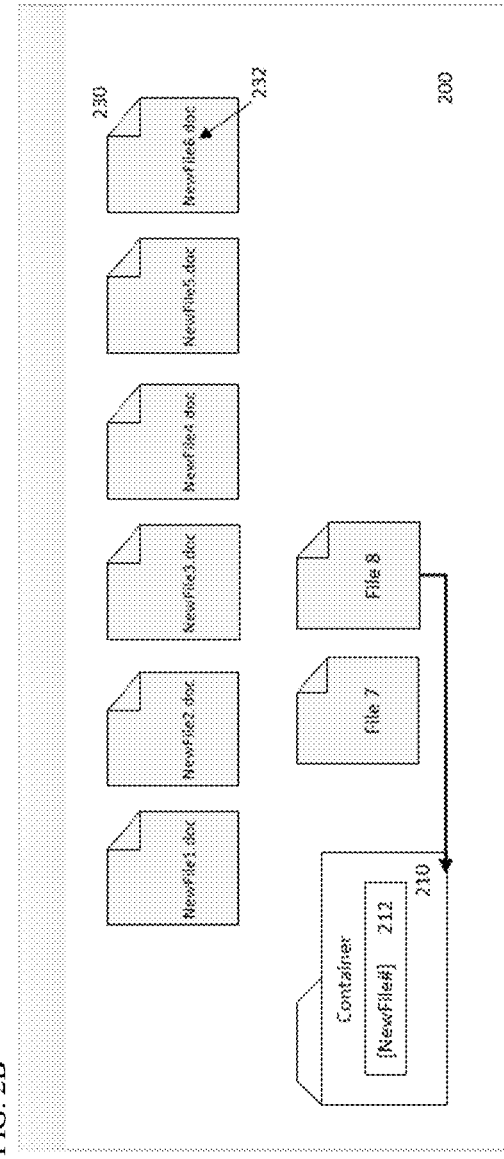
FIG. 2A
FIG. 2B

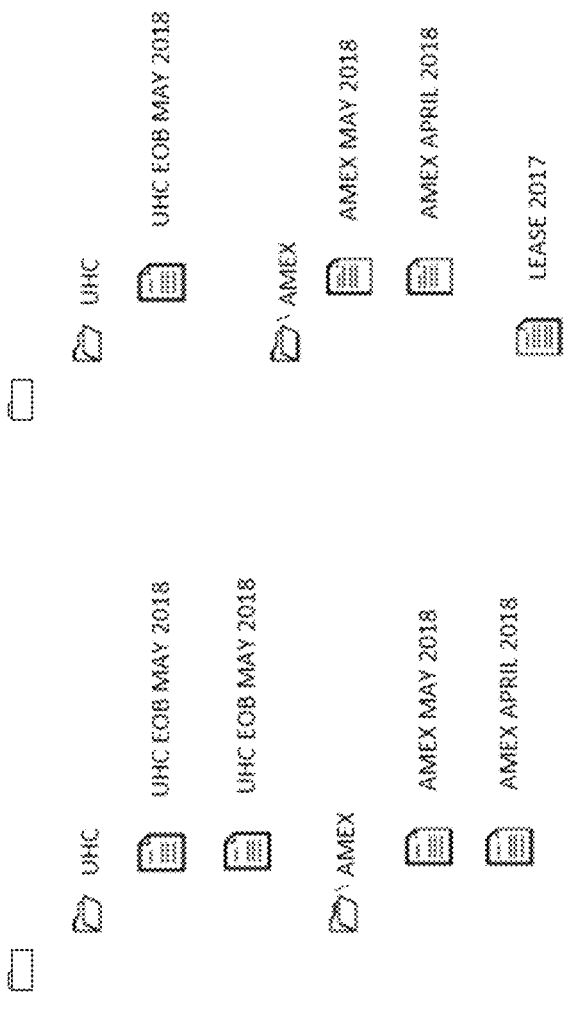
FIG. 7A
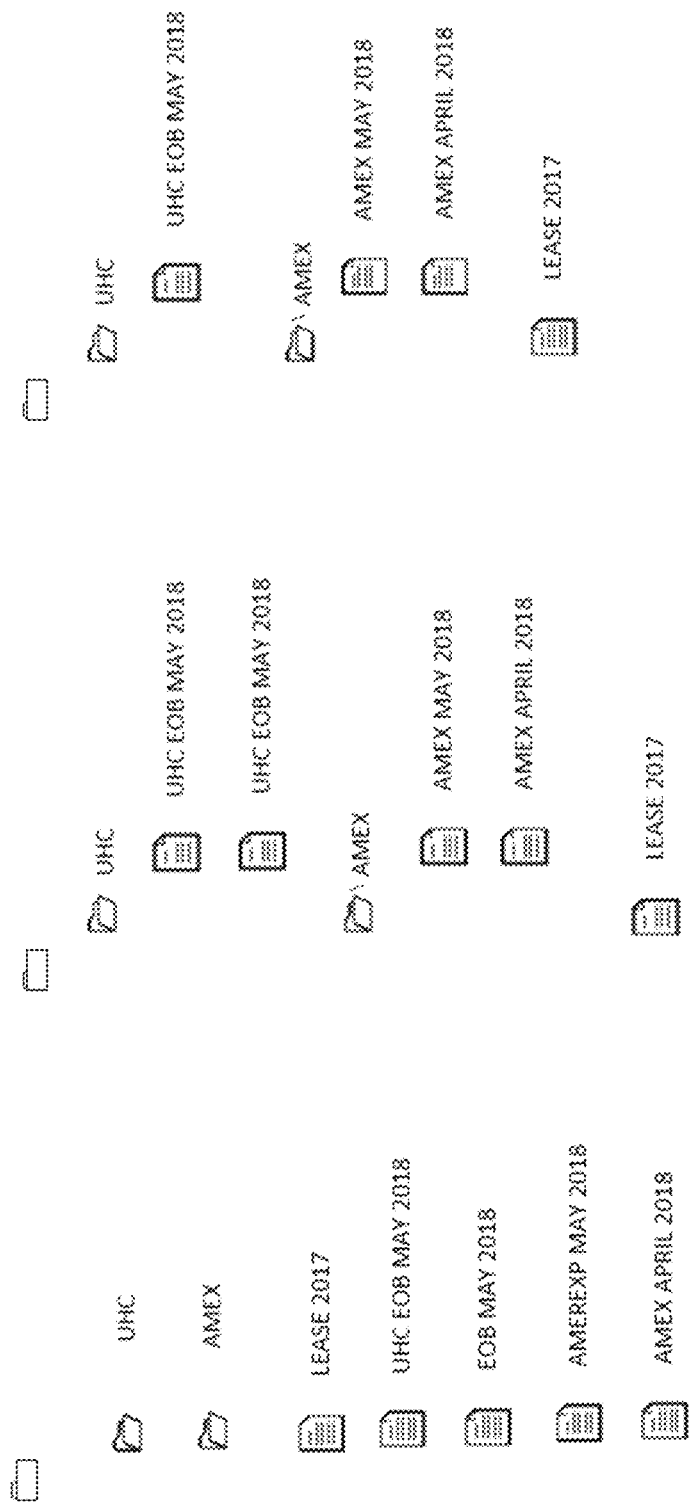
FIG. 7B
FIG. 7C

FILE NAMING AND MANAGEMENT SYSTEM

CROSS REFERENCE TO RELATED APPLICATIONS

The application claims the benefit of U.S. Provisional Application No. 62/517,930, filed on Jun. 11, 2017, which is incorporated by reference herein in its entirety.

FIELD OF INVENTION

The invention is related to a file management system.

BACKGROUND OF THE INVENTION

The invention relates generally to a file management system, more specifically a system for renaming files using file processing containers.

Managing a large set of files can be challenging as users generate an increasing number of new files as the amount of storage available increased over the past decade. With more storage available on the various devices, the number of files may grow to include hundreds or thousands of files in a multitude of formats without any organizational method.

As files are accumulated, users may store new files in new or existing folders that are unrelated to the contents of the file, and folders may contain numerous unrelated files that are uncategorized and may create clutter as well as inefficiency. For example, a user may save a dozen pictures of lilies and a hundred documents about cats in the 'Downloads' folder. In addition, file names may be inconsistent and unrelated to the contents of the file, which can make organizing these files difficult. For instance, a file downloaded from one website may be named using an internal naming schema that contains both text and numerical digits, i.e. A1000302.pdf, and a document downloaded from a different website may be named based on the year the file was created, i.e. 2016.docx.

As files continue to accumulate without any standardization or process in place for naming new files, the effort and resources needed to organize these files may become more complex over time. For many businesses, the task of organizing files is closely tied to how their work may be perceived. For instance, a professional service firm might be perceived as unprofessional by clients if project deliverable are named inconsistently and disorganized, making it difficult to find the desired documents.

The proper organization and tracking of the growing number of files may also be a requirement for many professionals as well. For instance, a litigation lawyer might be required to catalog thousands of files during a single discovery period. Hence, the lack of standardization may be especially problematic for referencing files in legal briefs and even more problematic, for example, if files are accidentally deleted or unintentionally moved from one folder to another location, because users may not notice that the file is missing, especially in folders with a large number of files.

Managing, organizing and tracking files continue to be a challenge for consumers and businesses alike and there is a demand for new technologies that can offer these capabilities. One solution that has been proposed in the past for managing the standardization of files is templates, but this solution typically requires running an entire system that can be computationally intensive and technologically restrictive. While the use of templates offers several benefits, such as data validation and standardization, it is also a very static solution. Once a template is set up to collect or ingest data and collect files, the template often does not offer additional benefit for managing after this point.

Accordingly, it is desirable to provide improved methods, systems, and computer program products for renaming multiple groups of files that overcomes drawbacks and inadequacies of known methods and systems.

SUMMARY OF THE INVENTIONS

Generally speaking, in accordance with an embodiment of the invention, a file organization system includes a container for renaming files added thereto, the container having a file naming convention by which the files are named. The container may generate a log file to store information regarding the history of the files, for example, the previous file names it has had, the current file name, the previous locations of the file and the current file location, the dates when the file was renamed or moved, etc.

An embodiment of the invention provides a container which renames the files in the folder or location in which the container is located.

Another embodiment of the invention is directed to a system having a plurality of containers in a common folder or location, each container having a different file naming convention.

Yet another embodiment of the invention is directed to a system in which a user may access a file management system via a network, the file management system having one or more containers for renaming and/or moving files. When the user moves a file into a container, the container renames the file and moves the file into a destination folder specified by the script for the container.

Still other objects and advantages of the invention will in part be obvious and will in part be apparent from the specification. Other features and advantages of this invention will become apparent in the following detailed description of exemplary embodiments of this invention with reference to the accompanying drawings.

BRIEF DESCRIPTION OF THE DRAWINGS

For a fuller understanding of the invention, reference is made to the following description taken in connection with the accompanying drawing, in which:

FIG. 1A is an illustration of a user interface for renaming files using a container in accordance with an embodiment of the invention;

FIG. 1B is an illustration of the user interface of the embodiment of FIG. 1A after the files were renamed;

FIG. 1C is an illustration of the user interface of FIG. 1B after an additional file was added to be renamed;

FIG. 1D is an illustration of the user interface of FIG. 1C after the additional file was renamed;

FIG. 2A is an illustration of a user interface for renaming files using a container in accordance with an embodiment of the invention;

FIG. 2B is an illustration of the user interface of FIG. 2A after a set of files were renamed;

FIG. 7A is an illustration of a user interface displaying the contents in a folder having two containers therein in accordance with and embodiment of the invention;

FIG. 7B is an illustration of the user interface of FIG. 7A displaying the contents in the folder after certain files therein were organized; and FIG. 7C is an illustration of the user interface of FIG. 7B displaying the contents in the folder after a duplicate file was removed.

DETAILED DESCRIPTION OF THE PREFERRED EMBODIMENTS

Figure 2C:
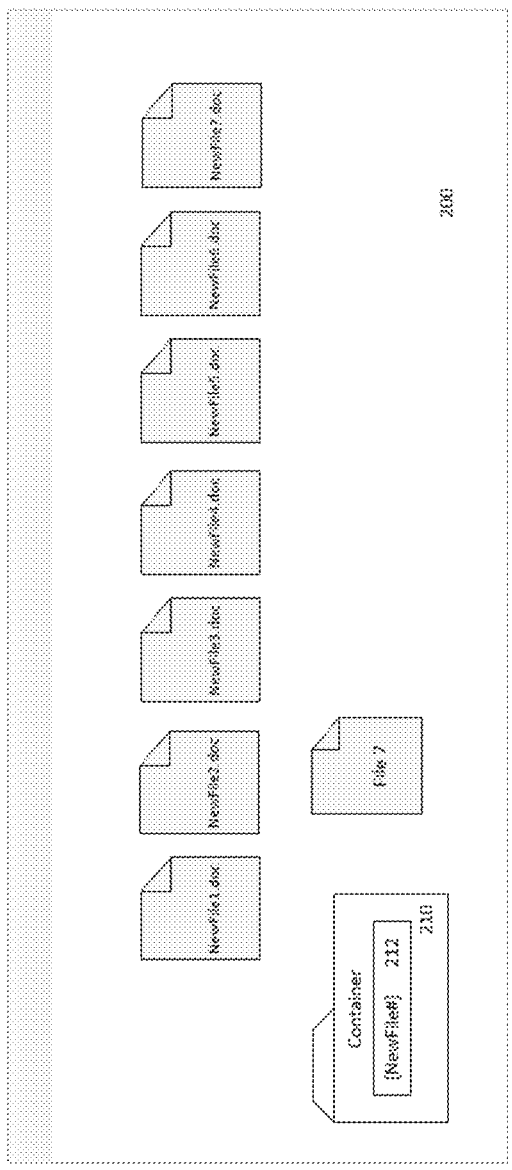
FIG. 2C is an illustration of the user interface of FIG. 2B after an additional file was renamed.

The invention generally is directed to a system for organizing and managing files, more particularly for renaming files, generating and tracking file information.

As used herein, the term "file" refers to a collection of electronic data or information stored and/or transmitted using an identifier, e.g. a file name. Exemplary file types include, but are not limited to, data files, text files, program files, directory files, word processing files, image files, and video files. The term "folder" refers to an entity in a file system that is used to group a collection of files and/or other folders. A folder may be referred to as a directory or catalog in a file system and may contain files and subfolders, which is a folder contained within a folder.

An embodiment of the invention automates the process of naming, processing, and tracking files using a file management solution, referred to herein as "a container." A container is preferably comprised of a sorting engine that processes source input based on a set of specifications that may be obtained from a user interface, configuration settings or file, and preferably works around the restrictions in the technology infrastructure.

The source input provides information used to identify, find, and/or acquire the files to be processed by the sorting engine. The source input may include, but is not limited to, a set of files, file locations, and criteria for selecting the files to be processed.

An exemplary embodiment of the specifications provides the sorting engine with the process or steps to be executed to acquire, process, and log the source input. A container may also include multiple processes that are executed based on a set of conditions or by following a series of sequential and conditional rules.

An example of steps for creating a container is as follows: 1. A user runs a script to create a container. 2. The user is prompted to select an output folder. 3. The user selects an output folder for files placed into the container. 4. System creates a script that runs and takes a set of actions when the user adds files to the container. 5. System generates the container (e.g., on the user's computer's desktop), 6. The user renames the container, which name will be the file naming convention for files added to the container thereafter. Alternatively, the user may enter the desired file naming convention into the metadata of the container.

When the user moves one or more files to the container, the script is run and adds code to the file management system so that the script is run when a file is added to the container. For example: 1. User, using a computer mouse or other suitable mechanism, selects a set of files and drags it into the container. 2. A script is run automatically. 3. The script moves the set of files to the designated location specified for the container. 4. A log file is generated with the names of the files. 5. A script renames each file using the name of the container and adds the new file names to the log file. Thus, a plurality of containers may move files into a common folder, thus resulting in a variety of file name types within the same folder.

Because the script is linked to the container, once a container is deleted from the device, server, etc., its associated scripts are also preferably deleted.

The source input and specification may be obtained either in part or completely via a user interface or another source, such as a file located in a particular folder, or by querying against an instructional database. Specifications may also be acquired or inferred based on the attributes of existing files, which may be obtained from combining logic, statistics, and data techniques, such as data science, models, machine learning algorithms or AI integrations. Part of this process may be scheduled, automated (e.g. execution of existing processes), integrated with other processes (i.e. running code that is already in production), or event based (e.g. conditional on the occurrence of a specific event).

Recalling the original file name may be difficult to recall with time, and even more difficult if many more files have been renamed since. Hence finding and tracking changes to files name may be a challenge when working with a large collection of documents, especially when file names are inconsistent. A pattern is usually difficult to find without consistent file names. Hence, the operations of many organizations may benefit from recording the source of files that are copied or moved into certain directories or file folders, implementing a default file name for files based on each file's location, and tracking the files previously processed by the container to assign the appropriate sequential number to newly processed files. Thus, an embodiment of the invention provides a log of such information.

In one embodiment of the invention, the container tracks information from files the container previously processed, including, but not limited to, the original file names, the original file location, new file location, and the sequential numbering of new file names. In another embodiment, the container displays a prompt to a user to inform the user of duplicate files or conflicts. The container may further give the user the option to cancel a file transfer or process to be performed by the container.

Containers preferably improve the process of managing, transferring, and organizing files by automating the process of generating new file names and standardizing the process of renaming multiple sets of files. In an exemplary embodiment, a container may be used to rename all files in a particular location, e.g., a file folder, using a default naming convention.

In accordance with an embodiment of the invention, containers are created on a computing device that is capable of working with data, by way of non-limiting example, a computer, mobile phone, or tablet. Containers may be utilized to process any data object or collection, not only files. One example of a container is a file folder that holds one or more files stored in memory. The container may recommend a new file name by referencing current file names of files in the folder when new files are saved in the folder. Another example of a container is a folder in a file directory with a cron process that generates a new file name for any files saved in the folder that does not match a predefined naming structure.

In accordance with an embodiment of the invention, a container is created by running a script on a computing device. For example, a script is run to generate a container on the desktop of the computing device, the container represented by an icon such as a folder icon from the operating system.

The container is configured to automatically rename any file added to the folder. For example, if a user selects certain files and drags it using a mouse to the container or otherwise adds the files to the container, the files are renamed. An example of a naming convention used for renaming the files is a combination of the container name and a sequential numerical value. The container may be configured so that the files and container can be accessed similarly as via the rest of the operating system.

For example, the process may include the following steps: 1. The user runs a container generating script on computer. 2. The script generates a new subdirectory or folder named "Container" on the user's desktop. (e.g. C:/Users/User/Desktop) 3. The user renames the container from "Container" to "Graduation." 4. The user transfers on or more files, DSC000123, DSC000124, and DSC000126, from a mobile device and saves it in the "Graduation" container. 5. The "Graduation" container renames DSC000123, DSC000124, and DSC000126 to Graduation0001, Graduation0002, and Graduation0003, respectively, and generates a log file with original file name, the new file name, the date and the time the file was saved in the "Graduation" container for each of the files. A common log file may include the data of all the files in the same folder or processed via the same container, or an individual file may be created for each file.

Reference is made to FIGS. 1A-1D, wherein an exemplary embodiment of the invention is illustrated. Container 100 is set up as a folder and configured to automatically rename files saved within the folder using the file naming convention 102. In the embodiment shown, the file naming convention 102 is Dog ###. The files added into container 100 would thus be renamed to have a filename comprising the word "Dog" and a sequential identifier having three digits.

Referring to FIG. 1A, files 112 and 114, having file names dogs.jpg and image.jpg respectively, are added to container 100 having file naming convention 102. As illustrated in FIG. 1B, file 112*a*, which was previously named "dogs.jpg" is renamed to have a file name Dog001. Likewise, file 114*a*, which was previously named "Image.jpg" is renamed to have a file name Dog002. Both files 112*a*, 114*a* are saved into folder 110 of container 100.

The container 100 notes the last-used sequential identifier, "002" of the file name "Dog002." Preferably, this data is saved in an external database. Any additional files saved in folder 110 are also renamed using the file naming convention 102. As illustrated in FIGS. 1C and 1D, when file 116 having a file name "File.jpg" is saved into container 100, it is renamed to "Dogs003.jpg" to follow the last-used sequential identifier.

Reference is made to the embodiment in FIGS. 2A-2C, in which a container 210 renames files within the same folder in which container 210 is located. As shown, container 210 and files 220 are located within folder 200. Files 220 are selected using a computer mouse and dragged therewith to container 210. Container 210 has a file naming convention 212, namely "NewFile #." In the example, there are six files being dragged onto Container 210, and since there are no files currently within folder 200 previously named using file naming convention 212, the first file, File1.doc, is renamed to NewFile1.doc. The subsequent files are named accordingly, each file receiving a sequential identifier one greater than the previous file. As shown in FIG. 2B, files 220 were renamed from File1.doc, File2.doc, File3.doc, File4.doc, File5.doc, File1.doc, to NewFile1.doc, NewFile2.doc, NewFile3.doc, NewFile4.doc, NewFile5.doc, NewFile6.doc. The largest sequential identifier 232 (number "6") is identified and stored. When an additional file is later dragged onto container 210, that file is given the subsequent sequential identifier "7" as illustrated in FIG. 2C. As shown, File7.doc, which was not dragged onto container 210, was not renamed, and File8.doc was given a new name NewFile7.doc.

Containers may also be generated on a computing device by creating a folder on the computing device such that it can automatically rename files using the system's default file system. These configurations may be implemented on the back end and may be undetectable to the user on the front end.

In accordance with another embodiment of the invention, a container may move a file to a new location, rename the file, or perform other tasks without having software installed on the computing device. Rather, the software may be on a server, and the user may set up or initiate the tasks online via a user interface.

For example, a script may be run to create a graphical user interface that allows users to select and submit the source input files. Instead of generating a container that appears and operates in the same ways as the folder generated by the operating system, running the script may generate a new icon on the user's desktop, which can be used to access the user interface and submit the source input.

For example, the process may include the following steps: 1. The user runs script on computer. 2. Script generates a new subdirectory, "Container" in the user's home directory (e.g. C:/Users/User) that contains the code to run the user interface on the computer, (i.e. C:/Users/User/Container/UI), and creates a shortcut, 'UI', on the user's desktop (i.e. C:/Users/User/Desktop/UI'). 3. The user clicks (or double-clicks) on the shortcut, opening the UI via the computer's web browser, preferably the default web browser. 4. Via the UI, the user selects one or more files (e.g. DSC000123, DSC000124, and DSC000126), selects the location for the output (i.e. folder where the files will be moved after processing) and submits the request, for example, by clicking "submit" on the UI. 5. The container changes the names of the selected files, moves the files to the indicated output location, and creates an entry in a log with the original file name, the location of the original file, the new file name, the new file location, the date and time for each file. The log is saved in a database, preferably located externally to the file system storing the files.

Figure 3A:
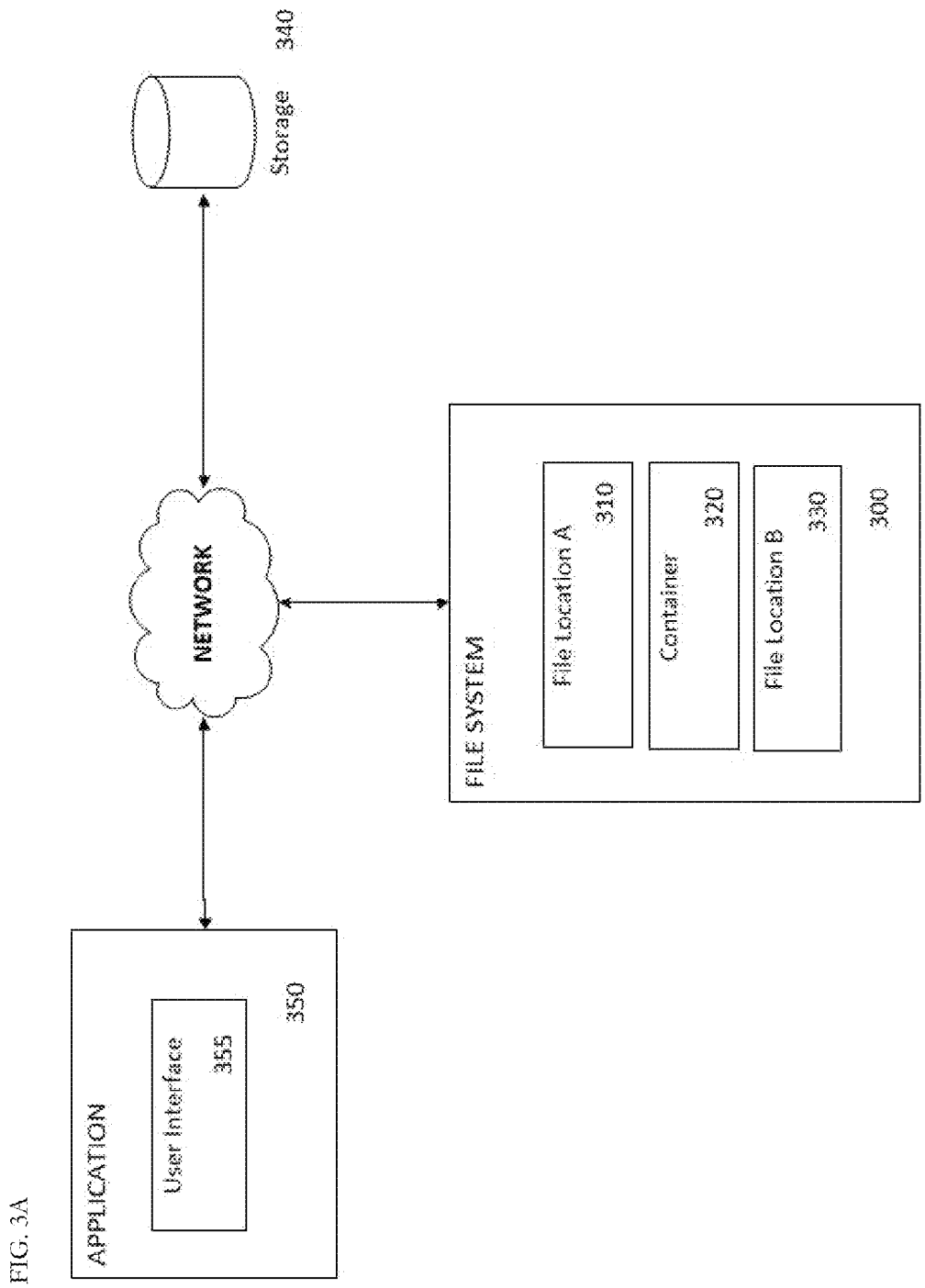
FIG. 3A is a block diagram illustrating a system for renaming files in a file system using a container in accordance with an embodiment of the invention.
Figure 3B:
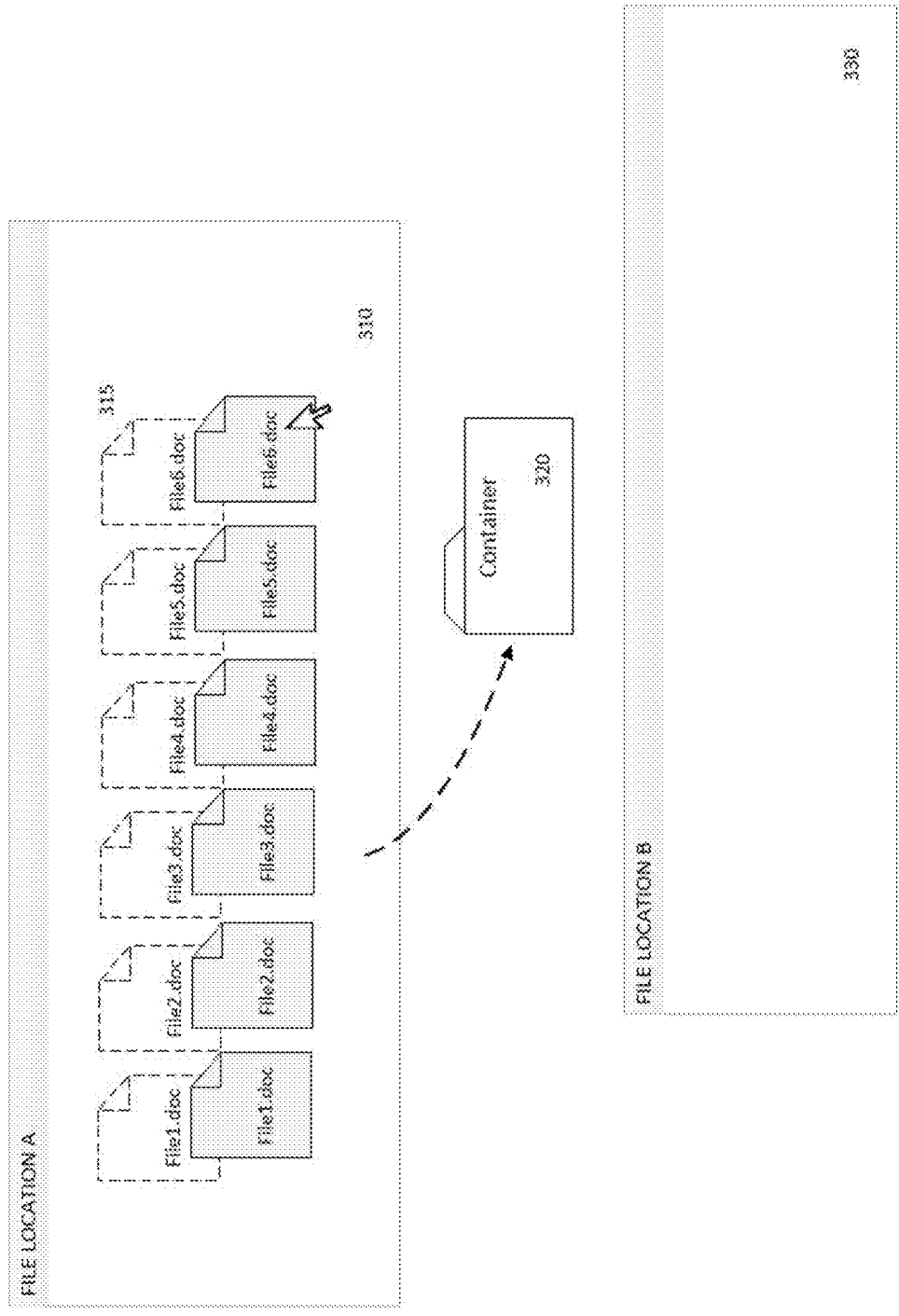
FIG. 3B is an illustration of a user interface for renaming file in accordance with an embodiment of FIG. 3A.
Figure 3C:
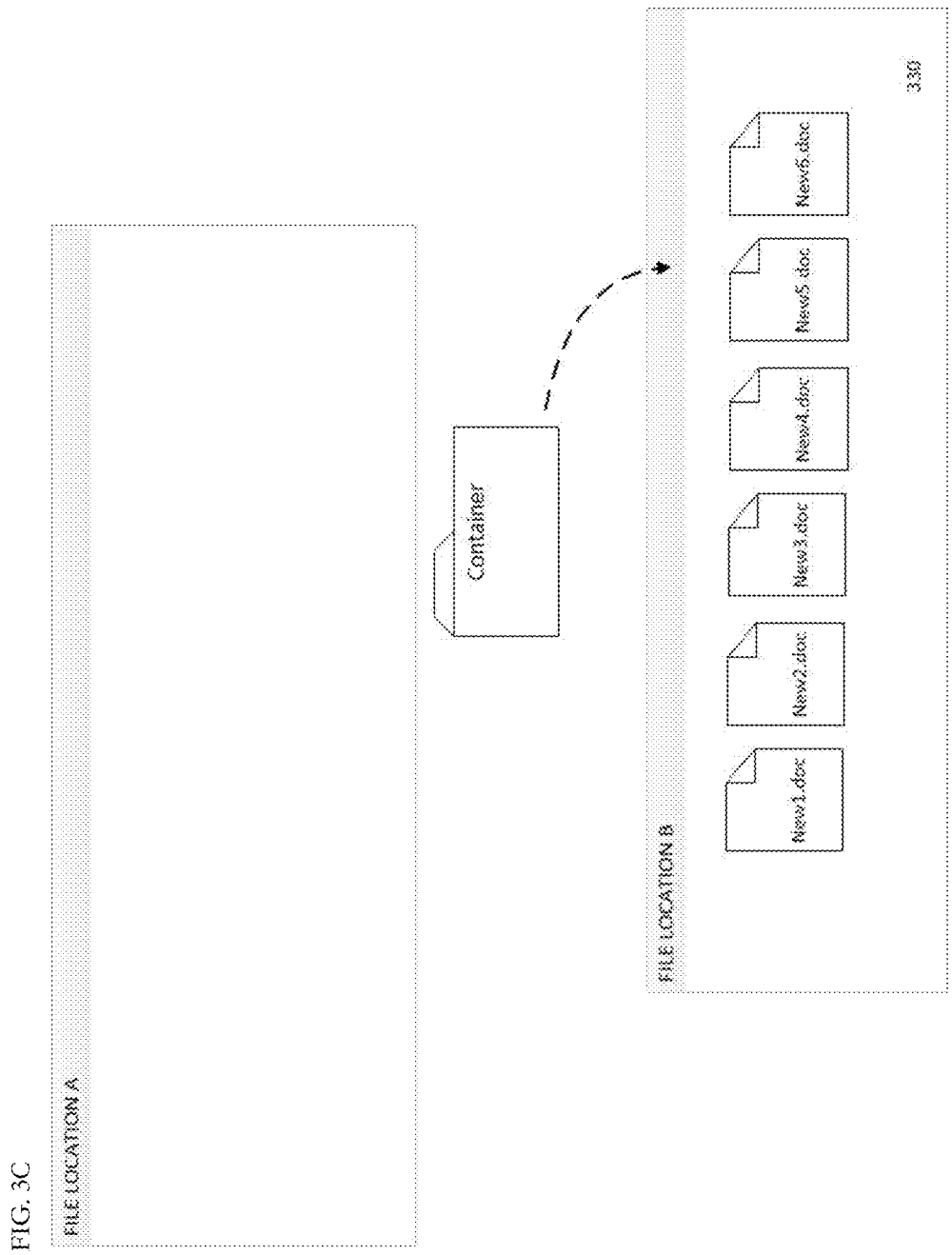
FIG. 3C is an illustration of the user interface of FIG. 3B after files were renamed and moved to a new location.

Reference is made to FIGS. 3A-3C, which illustrates an example of a system in which a user accesses files on a file system 300 through a network via a user interface 355 in an application 350. Selected files 315 in file location A 310 are dragged and dropped into container 320. The container 320 moves files 315 to a new location 330, records the old location 310 in a database 340 and renames files 315 using the container's file naming convention, namely "New." Thus, when the user dragged files 315 onto container 320, File1.doc, File2.doc, File3.doc, File4.doc, File5.doc, File1.doc were renamed to New1.doc, New2.doc, New3.doc, New4.doc, New5.doc, New6.doc and moved from file location A 310 to file location B 330. Whereas the user performs this task via the user interface 350, the files, the processor, the program, are all remotely accessed by the user, and are not located on the user's device. The file system 300 along with files 315, file locations A and B 310, 330, processors and programs for renaming and moving the files are preferably all located one or more servers, preferably a single server. Storage 340 which contains the logs of the files may be separate from file system 300 as shown, and accessed via a network such as the Internet or intranet. It is to be understood that storage 340 may be located on the same server as file system 300 or even within file storage 300, preferably within its own folder.

Figure 4:
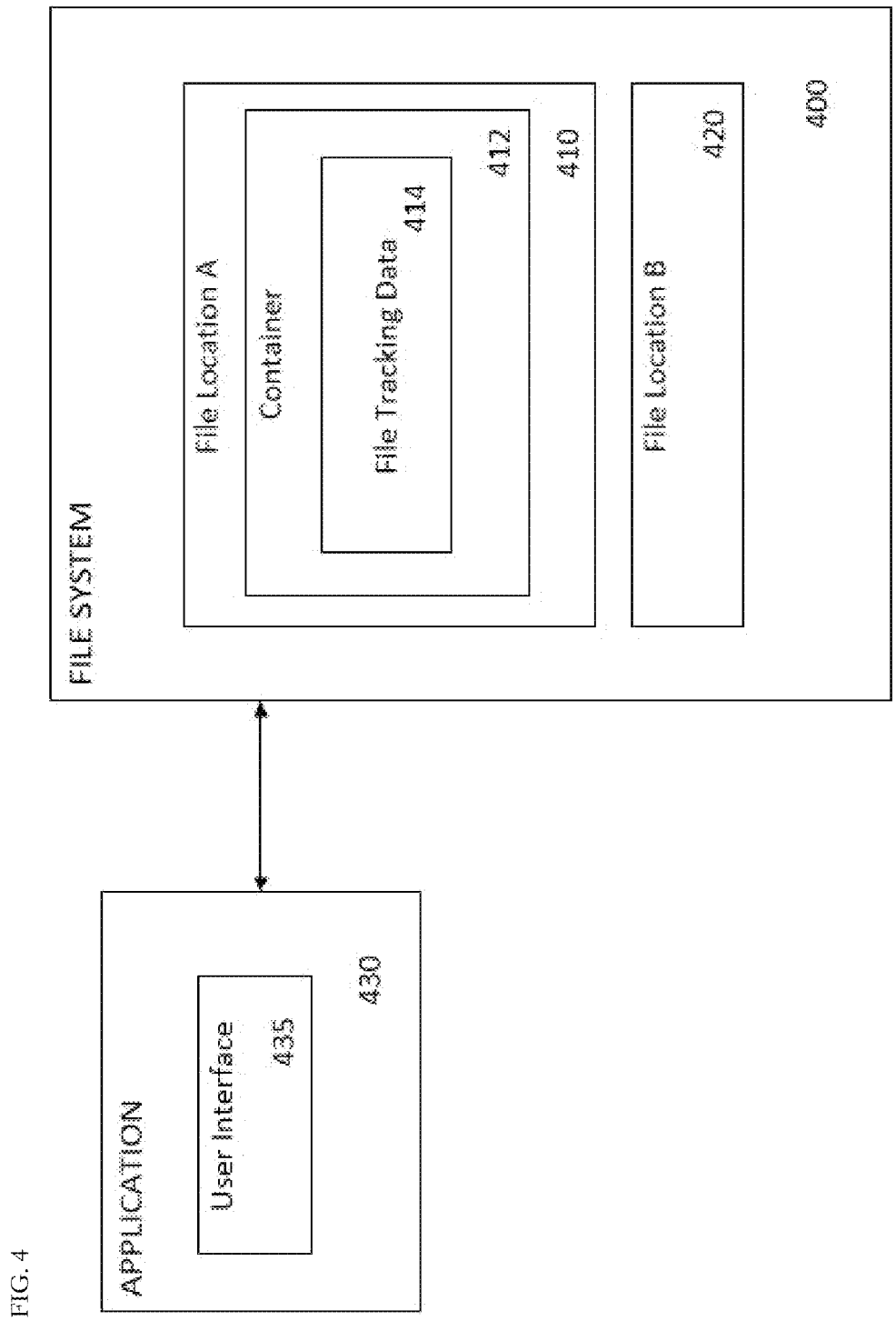
FIG. 4 is a block diagram illustrating a system for renaming files in a file system using a container in accordance with an embodiment of the invention.

Referring to the embodiment illustrated in FIG. 4, a user may access a file system 400 using user interface 435 via an application 430. The user may drag one or more files to container 412 in File Location A 410, which renames and moves the files to File Location B 420. Container 412 also tracks data 414 associated with the processed files, including, but not limited to, the original file names, the original file location, new file location, and the sequential numbering of the new file names. This tracking data 414 may be saved within container 412 or saved in a different location, either within file system 400 or externally.

Figure 5:
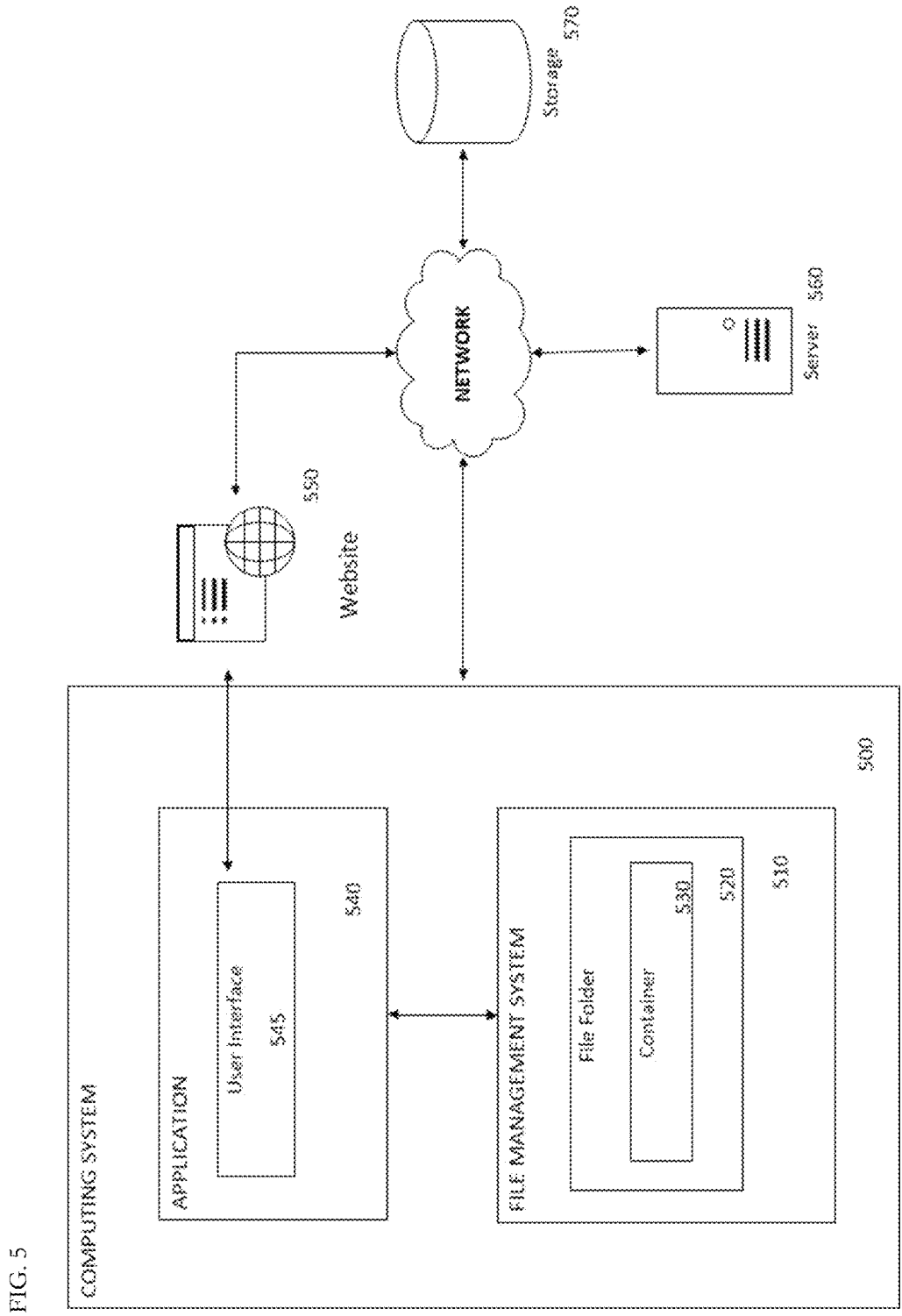
FIG. 5 is a block diagram illustrating a system for renaming files in a file system using a container in accordance with an embodiment of the invention.

Referring to FIG. 5, which illustrates an embodiment in which container 530 is implemented as a file naming server, which can access file information locally (i.e. in a text file or database) or using a network (including internet or intranet). As shown, the user accesses a website 550 using a user interface 545 of an application 540 on a computing system 500. When the user initiates the downloading of a file from a server 560 using website 550, the file is saved in container 530 within destination folder 520 of file management system 510. Container 530 accesses the database in storage 570, namely, the tracking data of the file, such as the file's download history data. After analyzing the tracking data, the container prompts the user, for example, via a pop-up window on user interface 545, if the file has been previously downloaded. The user may be prompted to decide whether the user wants to download the file again. Preferably, the user is notified when the file was previously downloaded, what file name it was given, and where it was saved, to assist the user in making the decision. Alternatively, container 530 may automatically cancel the download if the file had been previously downloaded and present in the destination folder. Preferably, the user is notified via the user interface. If the file had not been downloaded in the past, the file is preferably automatically saved in folder 520.

Alternatively, an installation file may be run on the user's device to install a new application on the local system. In one embodiment of the invention, one or more containers may be stored, generated or implemented by a server that users may access through a user interface or by connecting to the data source directly on the backend. The system may also be used to generate a record of any changes in the file system in the container for future reference, or maintained in another data storage system, such as a flat file or a database, locally, on the server, on an external storage unit or with another third party data service provider.

In one embodiment of the invention, the user may run a script, for example from a command line interface, to automate a file naming process, or create or select a naming, moving, or logging process of all the files that are placed in it. For example, any new folders created in a selected folder may be configured to automatically implement the designated file renaming process. If a user selects a folder called "Documents" and the script designates any new subfolders created in the "Documents" folder as a file renaming folder, every file added to any new subfolder created in the "Documents" folder will automatically be renamed according to the file naming convention of the subfolder. Preferably, a data file logging the original file name, new file name, previous location, new location, and/or other data regarding the file is created. The scripts for the naming, logging, etc. of the files are preferably stored within each subfolder.

Alternatively, if containers are generated across multiple directories or folders, the user preferably may select the use of multiple containers that may be managed simultaneously by consolidating the scripts, logs, etc.

An embodiment of the invention provides a dynamic file renaming system. In many fields, it is desirable to be able to effectively manage, rename, and reference files. For example, in law, where information is obtained in large volumes during discovery, an effective file management system may be beneficial during the course of a litigation. The task of managing information in a complex litigation requires keeping track of the file name and location of hundreds or thousands of files, as well as keeping track of the documents referencing these files.

In accordance with an embodiment of the invention, all files added to a container are logged and renamed in sequential order. Preferably, a document, such as a brief, motion, etc., is located in the same container or in the same folder as the container, the container having a file naming convention. The configuration for the container may also include dynamic renaming, so that the document is checked and the files are renamed in the order in which the file is referenced in the document.

Alternatively, the system may rename the files based on the citation or reference within the document. For example, the first file referenced in the document may be renamed '1' if the file is cited using a numerical referencing system, e.g. [1]. The system may be configured to search for each file using an exact match, e.g. searching for the original file name within the document, or by leveraging other automated processes or machine learning algorithms, e.g. searching for certain keys, words, or attributes in the document to match the file with the reference.

In another embodiment, the system may leverage information within the document to generate a record, log, metadata, output, reference or file name. For example, the container may be configured to take each reference in a document, search for a match within the files in the container and create a reference map for each match. The container may also be configured so that when a match is found, the file is automatically renamed using a predetermined naming structure, e.g. document title, before creating a citation and a reference table in the document.

Figure 6:
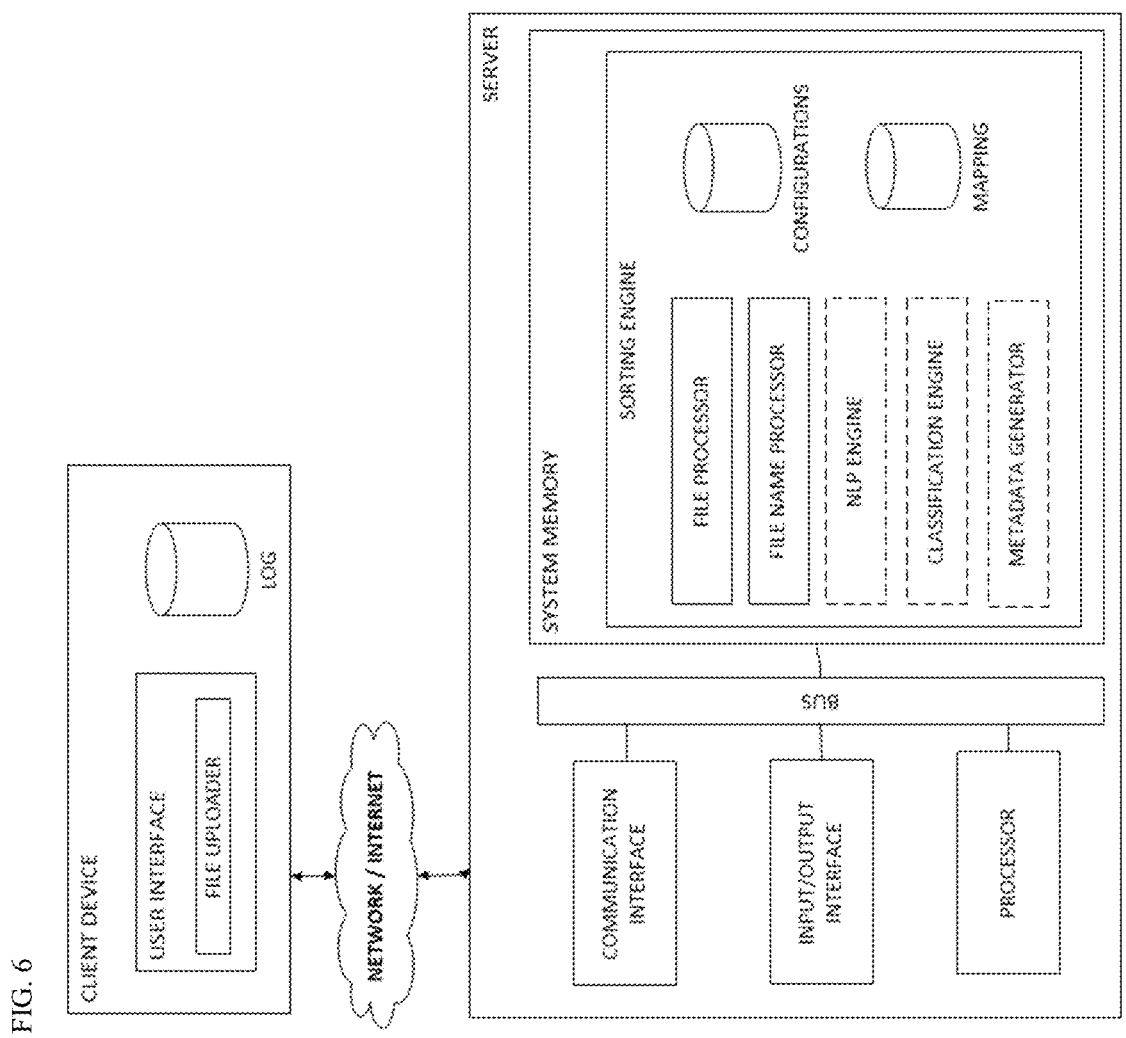
FIG. 6 is a block diagram illustrating a system for renaming files in a file system using a container in accordance with an embodiment of the invention.

Referring to FIG. 6, a user may access a server via a network using a user interface. The server includes a communication interface, an input/output interface, and a processor connected to a system memory having a container, namely a sorting engine. The sorting engine includes a file processor for searching and analyzing the contents of the files, a file name processor for naming the files, a natural-language processing (NLP) engine to extract content from the files, a classification engine, and a metadata generator. The features of the containers and the content of the files may be used to identify, rename, and/or sort a set of files.

Referring to FIGS. 7A-7C, a container includes two containers therein, UHC and AMEX. Using the names of the containers and the file names of the files within the container, the files are sorted and moved into their respective container, if available. As see in FIG. 7B, the files with "EOB" in their file names were moved to the UHC container, and renamed to be consistent, according to the container UHC's file naming convention dictated by its respective script. Likewise, the files with "AMEX" in their file names were moved into the AMEX container, and renamed according to the file naming convention of the AMEX container. The file LEASE 2017, which does not include either of these identifiers in its file name, is not moved, and remains in the container outside of the UHC and AMEX containers. Thus, multiple containers may be used for sorting multiple files.

As shown in the example illustrated in FIG. 7C, a container performs a deduplication process, during which duplicate files are deleted, which may improve eliminate clutter and confusion. Whereas files UHC EOB MAY 2018 and EOB MAY 2018 had different file names in FIG. 7A, when they were renamed using the file naming convention, it became evident in FIG. 7B that they were duplicates. Thus, as shown in FIG. 7C, one of them was deleted, and only a single file UHC EOB MAY 2018 remained.

Benefits of certain embodiments of the invention include the ability to utilize multiple naming conventions for the purpose of organizing files, the automated and consistent renaming of files and the automatic sequential numbering of new files processed using the container, and the tracking of file information and the reduction of duplicate files.

The container may be represented by a folder icon as shown in the drawings, but it may alternatively be represented by an icon that is distinct from a folder. By way of non-limiting example, an application may be installed and run to generate or configure the containers, a script may be run either automatically or manually using the operating system or a command line interface.

In one exemplary embodiment, the system may be accessed using a graphical or other suitable user interface that can be used to input configurations. In another embodiment, a user interface may be configured as another way to select and move a set of files into the container folder. For instance, users may use a web portal to upload a set of files to a container that are on the same device, on a local network or on another server.

In another illustrative embodiment, an application may be used to input, store, schedule and implement the configurations for a container. The output may be stored on the back end the program, within a data store or in a file within the folder that is named using a naming schema for the purpose of differentiating the files from the configurations.

It is to be understood that the term "add" includes dragging a file over the container's icon, whereafter the script associated with the container is preferably run, thus renaming the file and whichever other steps are specified by the container. The files need not actually be added to the container's folder, if the container has a folder. Whereas some of the embodiments of the container have been described herein as folders or illustrated as having the appearance of folders, one of ordinary skill would understand that the containers need not be folders.

Other alterations may be made without deviating from the scope of the invention. Accordingly, the system and method, the use, steps, order of steps, etc. may be varied as a matter of application specific design choice without deviating from the scope of the invention. For example, a system may include automated sorting capabilities by leveraging machine learning algorithms and artificial intelligence. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall there between.

I claim:

1. A file management system comprising:
a computing device having a user interface;
a server having a communication interface, an input/output interface, a system memory, a container comprising a sorting engine, a first processor, and a second processor, wherein:
said container is represented by an icon on said user interface, and said container further having a naming convention comprising a pre-determined text and a sequence formatting rule;
said sorting engine having a first script and a second script associated therewith;
said first processor which processes said first script to rename a file by incorporating said pre-determined text of the file naming convention; and
said second processor which processes said second script to create a log file and store information regarding said file;
wherein dragging said file over said container icon initiates said first processor to run said first script and said second processor to run said second script.

2. The system of claim 1, further comprising a destination folder into which said file is saved after being renamed.

3. The system of claim 2, wherein said destination folder is located within said container.

4. The system of claim 2, wherein said destination folder is located externally to said container.

5. The system of claim 2, wherein said container is located within said destination folder.

6. The system of claim 1, wherein said container includes container metadata having said file naming convention.

7. The system of claim 1, wherein said container has a container name, and further wherein said file naming convention comprises said container name and a sequential numerical value.

8. The system of claim 1, wherein said pre-determined text of the file naming convention is editable using said user interface.

9. The system of claim 1, wherein said log file includes one or more previous names of said file.

10. The system of claim 1, wherein said container has a third script which moves the file to a designated location specified for the container after said file is renamed.

11. The file management system of claim 1, wherein said computing device is said server.

12. A method of managing files on a file management system, the method comprising: running a script to create a container comprising a sorting engine and a container icon representing said container; selecting a destination folder in a file management system; designating a text and sequence formatting as a naming convention for said container; on a user interface, moving one or more files to said container by clicking and dragging icons representing said one or more files onto said container icon; moving said one or more files to said destination folder; generating a log with file names of said one or more files; and renaming said one or more files by the sorting engine according to said naming convention.

13. The method of claim 12, wherein said destination folder is located within said container.

14. The method of claim 12, wherein said container is located within said destination folder.

15. The method of claim 12, wherein said destination folder is located externally to said container.

16. The method of claim 12, wherein said log includes a date and time said one or more files were saved in said moved into said destination folder.

17. The method of claim 12, wherein said log includes one or more previous locations of said one or more files.

18. The method of claim 12, wherein said log includes one or more files' previous file names, previous locations, and times and dates said one or more files were moved.

19. The method of claim 12, wherein designating a naming convention for said container comprises entering said naming convention into metadata of said container.

20. A file management system comprising:
- a computing device having a user interface;
- a server having a communication interface, an input/output interface, a system memory having a folder, and a processor, further comprising one or more files located in said folder;
- a container represented by a container icon on said user interface, said container having a sorting engine comprising a first script, the container further having a file naming convention comprising a text and a sequential formatting rule; and
- a processor which processes said first script to name said one or more files by incorporating said text and following the sequential formatting rule according to the file naming convention when said first script is run;
- wherein upon dragging said one or more files over said container icon, said processor runs said first script and renames said one or more files in accordance with said file naming convention.

21. The system of claim 20 further comprising a log storage, wherein said container has a second script, and wherein said system further comprises a second processor which processes said second script to create a log file and store information in said log storage regarding said one or more files including one or more previous file names and one or more previous locations.

22. The system of claim 20, further comprising a destination folder, wherein said first script moves said one or more files to said destination folder after said one or more file is named.

* * * * *